United States Patent [19]
Silver et al.

[11] Patent Number: 5,340,605
[45] Date of Patent: Aug. 23, 1994

[54] METHOD FOR PLATING WITH METAL OXIDES

[75] Inventors: Gary L. Silver, Centerville; Frank S. Martin, Farmersville, both of Ohio

[73] Assignee: The United States of America as represented by the United States Department of Energy, Washington, D.C.

[21] Appl. No.: 26,643

[22] Filed: Mar. 5, 1993

[51] Int. Cl.$^5$ .............................................. B05D 1/00
[52] U.S. Cl. ............................. 427/126.3; 427/126.6; 427/230
[58] Field of Search ................... 427/126.3, 126.6, 230

[56] References Cited

U.S. PATENT DOCUMENTS

| | | | |
|---|---|---|---|
| 2,726,144 | 12/1955 | Wallis et al. | 23/183 |
| 3,127,241 | 3/1964 | Periard et al. | 23/201 |
| 3,248,251 | 4/1966 | Allen | 106/286 |
| 3,304,204 | 2/1967 | Menard | 427/126.6 |
| 3,875,296 | 4/1975 | Brubaker | 423/592 |
| 4,213,792 | 7/1980 | Marianeschi et al. | 106/286.6 |
| 4,228,204 | 10/1980 | Matuura | 427/372.2 |
| 4,498,936 | 2/1985 | Haselkorn | 148/6.15 R |
| 4,572,797 | 2/1986 | Silver | 252/631 |
| 4,693,916 | 9/1987 | Nagayama et al. | 427/397.7 |
| 4,882,183 | 11/1989 | Ino | 427/126.3 |

OTHER PUBLICATIONS

"British Advance Superconducting Thin Film", *Research & Development*, Nov. 1987, p. 45.
"Thin-Film Method", *Nature*, vol. 332, Mar. 31, 1988, p. 385.

*Primary Examiner*—Shrive Beck
*Assistant Examiner*—Vi Duong Dang
*Attorney, Agent, or Firm*—Russell D. Elliott; James H. Chafin; William R. Moser

[57] ABSTRACT

A method of plating hydrous metal oxides on at least one substrate, which method is indifferent to the electrochemical properties of the substrate, and comprises reacting metallic ions in aqueous solution with an appropriate oxidizing agent such as sodium hypochlorite or calcium sulfite with oxygen under suitable conditions of pH and concentration such that oxidation and precipitation of metal oxide are sufficiently slow to allow satisfactory plating of metal oxide on the substrate.

11 Claims, 1 Drawing Sheet

METHOD FOR PLATING WITH METAL OXIDES

GOVERNMENT RIGHTS

The United States Government has rights in this invention pursuant to Contract No. DE-AC04-76DP00053 between the U.S. Department of Energy (DOE) and the Monsanto Research Corporation.

BACKGROUND OF THE INVENTION

1. Field of Invention

This invention pertains to plating, and more particularly to plating metal oxides by a method that is indifferent to the electrical properties of the substrate.

2. Description of the Related Art

Plating technology is widely used in modern society. Typical examples include gold-plated jewelry, silver-plated dinnerware, chrome-plated automobile parts, copper-plated pots, and zinc-plated steel. Plating is also used for a variety of purposes such as corrosion resistance, surface hardening, and appearance. In addition to plating, many other techniques for coating surfaces are also known, including sputtering and anodizing.

While many methods are known for plating with electrically conductive metals such as gold and silver, very few methods are known for plating with nonconducting materials such as metal oxides. When it is desired to deposit a metal coating on a surface, it is usual that the surface to be coated, the "substrate," be electrically conducting. When an oxide coating is desired, the customary method is anodizing, a process that generates a protective coating of oxide on the surface of conducting metal. The metal oxide coating is derived from the substrate itself; it is not ordinarily derived from an element not found in the substrate.

Advantage would be served by a method of plating with metal oxides that is indifferent to the electrical properties of the substrate. Such a method of plating, for example, would be beneficial for purposes of corrosion protection or to establish superconductive oxide films on the surfaces of otherwise electrically resistive materials.

For purposes of plating with metal oxides, aqueous solutions have many advantages; virtually every element can be rendered soluble in water. This allows the possibility of plating with oxides of elements that form insoluble oxides. Moreover, aqueous solutions can be prepared in an enormous range of compositions. Solutions may contain traces of elements that can be coprecipitated or adsorbed in the metal oxide so that the electromagnetic or superconducting properties of the coating are altered in some desired way.

At the present time, techniques available for plating with metal oxides are limited. As mentioned above, one common method is anodization. However, as indicated, the method of anodization is not indifferent to the electrical properties of the substrate. Recently, Japanese researchers in their effort to coat a chrome-nickel coil with yttrium-barium-copper oxide (high temperature superconducting material) have achieved some success in using chemical vapor deposition techniques. See *Nature* 322, 295; (1988).

Other technologies exist which relate to oxidation of metals for a variety of different purposes but which do not include plating metal oxides on substrates. For example, in U.S. Pat. No. 4,572,797, G. L. Silver, a method was described for removing pollutants from aqueous solutions using an oxidizing agent to oxidize contaminants in order to form oxidized products which are insoluble in the liquid and precipitate therefrom. Other art which pertains to metal oxides includes U.S. Pat. No. 2,726,144, Wallis et al., pertaining to a method of precipitating cobalt hydroxide, and U.S. Pat. No. 3,875,296, B. D. Brubaker, in which the inventor proposes to grow fibers of nickel oxide or a mixture of nickel oxide and magnesium oxide in order to prepare fibrous material resistant to high temperatures. These technologies, however, do not share the intention described in the present disclosure of plating metal oxides in such a way as to preserve or achieve desirable electrical properties in either the substrate or the plate.

In light of developments in the last decade pertaining to the use and development of high-temperature superconductors, there exists a significant need for a simple and adaptable method to plate metal oxides on a variety of insulating and noninsulating substrates.

Brief Summary of the Invention

Accordingly, it is an object of this invention to provide a method for plating metal oxides on substrates, such as glass rods and plates, which are substantially electrically and chemically inert with respect to the plating conditions.

It is another object of the invention to achieve satisfactory plating of metal oxides by controlling conditions to ensure that precipitation of oxides occurs at a rate which is sufficiently slow to permit adhesion of metal oxides to desired substrates rather than at a higher rate which favors formation of precipitate suspensions and inhibits plating.

It is another object of the invention to perform plating of metal oxides using dilute aqueous solutions.

It is yet another object of the invention to plate metal oxides using oxidants such as sodium hypochlorite or calcium sulfite.

It is yet another object of the invention to provide a method for plating metal oxides that is subject to facile modification to change the rate of the plating, the metal that is plated, and the circumstances of plating.

It is yet another object of the invention to provide for such modification by means of adjustment of the pH of the solution from which metal oxide is deposited.

It is yet another object of the invention to provide a method by which such modification may be achieved by changing the concentration of metal in the solution from which metal oxide is deposited.

It is yet another object of this invention to provide a method which operates in continuous fashion in conjunction with a running effluent stream.

Upon further study of the specification and appended claims, further objects and advantages of this invention will become apparent to those skilled in the art.

These objects have been obtained by providing a method of plating metal oxides that is indifferent to the electrical properties of the substrate, which method comprises:

Combining metal ions in dilute aqueous solution with an oxidizing agent within a reaction vessel (for example, a column or a cylinder) containing water and the reactants under conditions which ensure slow precipitation and adsorption of metal oxide onto a desired substrate, or substrates, in a continuous fashion, whereby metal ions and oxidants may be continuously added to the reaction vessel and effluent solution is allowed to continuously pass out of the reaction vessel so that the level of the liquid in the column remains substantially constant.

The method has been carried out in an apparatus comprising:
a generally cylindrical tube,
water within said tube,
a reservoir which may be within said tube in operative association with both the top of said tube and said water,
a means for introducing metal ions in dilute aqueous solution into said water via said reservoir, and a means for introducing oxidant into said water via said reservoir,
a valve means associated with the bottom of said tube permitting liquid to be passed out of said tube at a controlled rate such that the level of liquid in said tube remains substantially constant despite the addition of liquid containing metal ions and oxidant through said two introduction means,
a means for introducing gas into said water in the region of the bottom portion of said cylindrical tube,
a gas dispersion means (for example, a frit) through which gas to be introduced into the reaction vessel is passed such that fine bubbles are formed in said water, and
a means for placing a substrate or substrates, onto which metal oxide is to be plated, in physical association with said water,
wherein the diameter and length of said cylindrical tube and reservoir are selected, and the chemical conditions within said tube including pH and concentration of reactants may be controlled, such that the rate of precipitation of metal oxide and adsorption of metal oxide onto substrates may be kept suitably low so as to achieve the desired plating result.

DETAILED DISCUSSION

Figure 1:
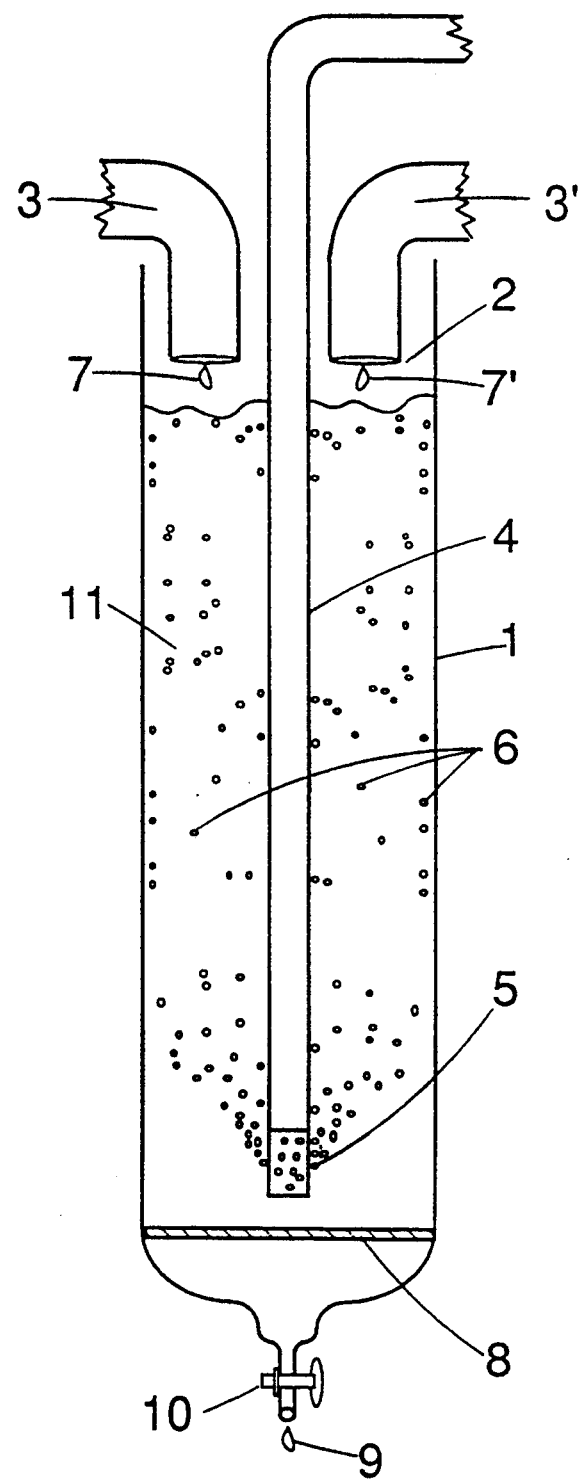
FIG. 1 illustrates a preferred apparatus for performance of the process of this invention.

In this disclosure, the terms "hydrated metal oxide," "hydrous metal oxide," "metal hydroxide," "$M_2O_3 \cdot nH_2O$," or "$M(OH)_3$" all refer to a composition of matter commonly spoken of as the trivalent metal hydroxide or the hydrated oxide of the trivalent metal cation, such as nickel and cobalt. In the case of manganese, for example, substitute "tetravalent" for "trivalent."

It is already known that cobalt and nickel can be oxidized in aqueous solution to the hydrated trivalent oxides, sometimes referred to as cobaltic and nickelic hydroxides, respectively. E. A. P. Duvuyst, V. A. Ettel, and M. A. Mosolu, Chemtech, 9(7), 426 (1979). Prior to this invention, it was not known that the insoluble, higher-valent oxides can be formed on surfaces with which the liquid is in contact. The new and unexpected result of the present invention is that high-quality, uniform plating of metal oxides can be achieved by regulating the conditions of reaction so as to permit oxidation to occur very slowly. This allows controlled precipitation and adhesion of oxides to desired substrates whereas more rapid oxidation favors creation of a suspension of oxide within the reaction medium.

The various objects, features, and intended advantages of the present invention will be more fully appreciated as the same becomes better understood when considered in conjunction with the accompanying drawing, and wherein:

Referring to FIG. 1, an upright cylindrical glass column (1) about 20 inches long and 2 inches in diameter is filled partially with water (11). In the column is a long glass tube (4) with a coarse frit (5) at an end disposed near the bottom of the column (1). Through the tube is bubbled oxygen gas (6) which produces turbulence in the tube and keeps the solution well agitated. During operation, dilute aqueous solutions of metal ions enter the cylinder via an inlet pipe (3), by drops (7), and a solution of sodium hypochlorite likewise enters the cylinder via a second inlet pipe (3'), by drops (7'). These drops pass through a reservoir (2) above the level of fluid. A flare in the glass tube for the purpose of increasing the volume of the reservoir is optional. At the same time, water (together with any dissolved or suspended species therein) is allowed to drip (9) from the bottom of the tube through a stopcock (valve) (10). The rate of inflow of the metal-bearing solutions is maintained nearly equal to the rate of the outflow of fluid from the bottom of the column so that the level of the liquid in the column remains essentially constant. The hypochlorite solution contains about one percent sodium hypochlorite by weight and usually some boric acid. The pH of the solution is adjusted with acid or alkali. About 5 to 20 drops of metal-bearing solution are allowed to enter the column for every drop of hypochlorite solution.

Any metal which forms a higher oxide insoluble in water is suited to the process of the present invention. Cobalt, nickel and manganese, for examples, can all be oxidized in aqueous solution to a higher oxidation state that forms an insoluble hydrous oxide. In the cases of cobalt and nickel, this hydrous oxide is the hydrated trivalent metal compound of the formula $M_2O_3 \cdot nH_2O$, sometimes written as $M(OH)_3$. In the case of manganese, it is hydrated $MnO_2$. For other metals, the hydrous oxides formed will depend on the particular oxidation characteristics associated with the metal ions involved. Sodium hypochlorite is a sufficiently powerful oxidizing agent to effect the oxidation of metal if the pH is not too low. Generally speaking, the easier the oxidation of the metal (Equation 1), the lower the acceptable pH of operation; however, it has been demonstrated that a range of pH values can usually be tolerated for acceptable plating of hydrous oxides. Metallic elements that are more difficult to oxidize, such as lead or bismuth, will require a higher pH.

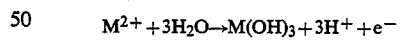
$$M^{2+} + 3H_2O \rightarrow M(OH)_3 + 3H^+ + e^-$$

Equation 1 is illustrative only; the hydrous oxide generated will depend on the metal species used. For example, with manganese the product will be a dioxide and the stoichiometry of the reaction will change accordingly. The letter "e" symbolizes an electron.

If the pH of the solution is too low, the oxidation reaction will be inhibited and no plating will be possible. If the pH of the solution is too high, the solutions tend to form suspensions of precipitated hydrous oxides, and plating may also be inhibited, but not necessarily prevented. The reason for this seems to be that metal ions entering dropwise are instantaneously oxidized by the hypochlorite resulting in suspensions of the hydrated metal oxide. These particles in suspension form alternative surfaces on which subsequent metal oxide is deposited. Thus, the precipitate grows both by the formation of new nuclei as well as by plating of the metal oxide on the surface of suspended particles. Too much suspended precipitate results in little or no plating upon the interior of the glass tube or on the substrates suspended therein.

In a similar fashion, it is necessary for the concentration of metal ions to be sufficiently low so as to ensure that excess amounts of metal oxide are not rapidly formed. Ion concentrations that are too high could likewise cause generation of suspended particles of oxide which would tend to inhibit the desired plating. Satisfactory deposition of metal oxide on the desired substrate depends in part on slow formation of metal oxide within the reaction medium.

When a precipitate of hydrous metal oxide is observed in the glass cylinder, a change in plating conditions may be indicated. This can be effected in several ways: 1) Adding a few grams of boric acid to the metal solution helps lower the pH of the liquid in which oxidation is effected by the hypochlorite. 2) A few grams of boric acid or other nonreducing buffer can be added to the hypochlorite solution so that the pH of the solution in the column never reaches too high of a value. The pH of the hypochlorite can also be lowered with a few drops of hydrochloric acid: any boric acid contained in the solution will act as a pH buffer. 3) Changing the ratio of drops of metal solution to hypochlorite solution entering will also change plating conditions. This ratio has been varied between about 5:1 to about 20:1, thereby controlling the pH of the solution, and the rate of deposition of oxide, in the examples to be discussed. The precise effect that adjusting the above factors will have on the plating process will vary according to the type or types of metal ions used.

The process of this invention works as if the mechanism of plating were the precipitation of hydrous metal oxide catalytically generated on surfaces. Although catalysis by surfaces is not a new chemical phenomenon, until now it was not known how to plate metal oxides by regulating reaction conditions as described in this disclosure. Too high of a pH or too high of a concentration of metal ion produces immediate oxidation to an insoluble precipitate that does not plate and interferes with subsequent plating. Diminishing either the concentration of metal or the pH or both diminishes the rate of homogeneous oxidation and precipitation in the solution thereby allowing heterogeneous oxidation and precipitation at a surface to be the rate-controlling step. Thus, the catalytic oxidation of metal ion at a surface is followed by precipitation that is controlled by a solubility product. Studies conducted pertaining to this invention do not reveal the precise mechanism of plating, but when properly operated, the system behaves as if the postulated mechanism were controlling.

Operating the plating bath in the manner of a continuously flowing column allows unwanted precipitate to accumulate at the bottom of the column. Where radioactive or otherwise hazardous metal species are used, a filter (8) may be placed at the bottom of the column (1) above the valve (10) so as to allow for trapping of hazardous material. In the absence of a filter, precipitate of metal hydroxides may be allowed to pass completely out of the column (1). Where a filter is used, the precipitate of metal hydroxides slowly accumulates on the filter (8). In either situation, the solution from which plating on surfaces is effected is left clear.

The plating of hydrous metal oxides can also be effected with calcium sulfite and oxygen gas. The use of calcium sulfite as an oxidant has been described elsewhere including U.S. Pat. No. 4,572,797, G. L. Silver.

Earlier disclosures, however, have not taught plating of metal oxides using this method. Calcium sulfite is more troublesome to add to the column than aqueous sodium hypochlorite because the calcium sulfite must be mechanically added as a solid. Aqueous sodium hypochlorite, on the other hand, can be added in a continuous manner by a means of a siphon. A greater breadth of pH range is possible with hypochlorite than with calcium sulfite, as well, and with hypochlorite there is no danger of plugging the filter (if one is used) at the bottom of the glass column, as may occur with the powder-like calcium sulfite. For these reasons, the more preferred embodiment of this invention employs sodium hypochlorite; however, the efficacy of calcium sulfite as an oxidizing agent is also noted here. When calcium sulfite is used as the oxidizing agent, oxygen is essential for plating. Where calcium sulfite is not used as the oxidant, and sodium hypochlorite is used instead, it is believed that the oxygen bubbles (6) serve merely to keep the solution in the column well agitated.

As noted above, the concentration of metal in solution affects the plating operation substantially. Dilute solutions produce more uniform and thicker coatings of plated metal oxide than do concentrated metal solutions. Tests have been carried out using metal ions at concentrations of about 0.1 g/l and 0.5 g/l. While the former may yield some precipitate at first, the column liquid usually clears after a few hours as plating begins on all interior surfaces of the cylinder. Solutions of 0.5 g/l often yield substantial quantities of unproductive precipitate and only thinner insubstantial coatings of hydrated metal oxide.

In a typical example, the gas flow, the flow of the metal and hypochlorite solutions into the water-filled column, and the flow of liquid from the bottom of the column are all started together. With the solution containing about 0.1 g/l of metal, some precipitation might appear at first, but it disappears from the column within a few hours. Then the inner wall of the glass cylinder is gradually observed to darken as the plate of metal oxide begins to accumulate. At the same time, the gas delivery tube within the liquid also begins to darken as metal oxide is deposited on it. Test pieces (for example, small glass rods resting at the bottom of the glass cylinder or small glass plates mechanically attached with hooks to the glass tube) are also observed to darken as hydrous metal oxide accumulates on their surfaces.

Plating is typically allowed to continue until about 1.5 grams of metal has passed through the cylinder. Using a concentration of metal equal to 0.1 g/l, this means that approximately 15 liters of solution passes through the column. The passage of liquid may require a few eight-hour workdays. (A typical flow rate of liquid through the column averages about 12 ml/min. This rate is varied from about 7 to about 16 ml/min.) The test pieces are then recovered for examination and the column is cleaned for the next run.

The same procedure is used for metal salts at a concentration of 0.5 g/l. In this case, however, only about 1/5 of the time is required because only about 1/5 of the volume of metal solution is used in the plating operation and needs to pass through the column. Thus, approximately the same quantity of metal is used in each run. As has already been remarked, the more dilute solutions give a better deposit of hydrous metal oxide than do more concentrated solutions.

Surface compositions of metal oxide plates can be determined by x-ray photoelectron spectroscopy. The nature of this technique makes the numbers approximate. Bulk composition of the plate is determined by dissolving the coating in hydrochloric acid and analyzing the solutions for metals by the inductively coupled plasma technique. The coatings produced by this invention are usually thick enough to be opaque or to greatly attenuate a beam of light. The actual weight of the dried coating, however, is only a few milligrams. Hence, the compositions of coatings sometimes cannot be determined to extremely high accuracy. Thickness of plate is measured by photomicroscopy using an average of ten determinations.

Without further elaboration, it is believed that one skilled in the art can, using the preceding description, utilize the present invention to its fullest extent. The following preferred embodiments, presented here as examples, are therefore to be construed as merely illustrative and not limitative of the remainder of the disclosure in any way whatsoever.

EXAMPLES

The following examples of the method of this invention are carried out using the apparatus of FIG. 1. The apparatus has the dimensions summarized above. The flow rate of oxygen gas into the chamber is not critical and is simply adjusted to provide sufficient turbulence to effect agitation and, when sulfite/$O_2$ was used as the oxidizing agent, to ensure suspension of the calcium sulfite. The flow rates of the oxidizing agent and the flow rates of the metal ion solutions are described below. All examples are carried out at ambient room temperature in the range of about 20–25 degrees Celsius.

The movement of the liquid in each case is downward through the column. The liquid emerging from the bottom of the column is analyzed conventionally to determine pH after passing through the valve. Unless otherwise indicated, reagents are added dropwise, and the ratio of drops of metal ion solution to hypochlorite solution is varied between about 5:1 and about 20:1, as required to maintain the effluent pH values described in the examples. In all cases in which hypochlorite is the oxidant, 1% aqueous sodium hypochlorite (commercial grade) is used. Where the pH of reagents is adjusted, acid or alkali is used. Results obtained by the inventors using each described method are set forth in the examples. The first three examples prove the plating principle only.

EXAMPLE 1

In this example, 3500 ml of nickel chloride solution is passed through the column as described above. The concentration of the nickel is 0.45 g/l, and the solution also contains a total of 6 grams of boric acid. The hypochlorite solution contains 2 g/l of boric acid and is added dropwise as decribed above. The final effluent pH is 7.23. The glass cylinder that is clear at the beginning of the demonstration turns black by the end, indicating that plating of metal oxide has occurred. The cylinder becomes opaque and does not transmit the light of a flashlight through it.

EXAMPLE 2

This example is like Example 1 above, except that the nickel solution contains 0.5 g/l of nickel as well as the total of 6 grams of boric acid. The pH of the nickel solution is adjusted to about 5.9. The hypochlorite solution contained 2 g/l of boric acid, and the pH is adjusted to 8.95. The effluent flow rate averages about 14.89 ml/min. The initial pH of the effluent is 8.10, the final pH is 7.50, and the average of all pH readings during the demonstration is 7.75. The range of effluent pH values is 7.50 to 8.10. No particles are observed in the run, and the clear glass column is again rendered opaque by the end of the trial, indicating that metal oxide plating has occurred.

EXAMPLE 3

This example is like Example 2 above, but the nickel solution contains no boric acid. The hypochlorite solution contains 6 g/l of boric acid and has an initial pH of 10.00. The effluent flow rate averages about 10.77 ml/min. The initial pH of the column effluent is 8.70, the final pH is 8.25, and the average of all pH readings is 8.40. The range of effluent pH values is 8.25 to 8.70. Particles of precipitate are observed to have formed in the column. Despite some loss of nickel by particle formation in the column, by the end of the run the glass tube turns black and the beam of a flashlight cannot be perceived through the column, indicating that plating of metal oxide has occurred.

The above three examples establish proof of the plating principle and indicate approximate conditions that can be used to produce nickel oxide plating. For the following examples, test results of plate samples are disclosed.

Example 4

In this example, the nickel solution contains 0.5 g/l of nickel, but no boric acid. The hypochlorite solution contains 6 g/l of boric acid, and its pH is adjusted to 9.00. The effluent flow rate averages about 4.6 ml/min. The initial pH of the effluent is 7.44, the final pH is 7.80, and the average of all pH readings is 7.54. The range of effluent pH is from 7.40 to 7.80. Particle formation is observed in the column. By the end of the run, the glass column looks opaque, indicating that plating of metal oxide has occurred. The beam of a flashlight, although greatly attenuated, can be detected through the column walls. A small glass rod placed in the column is recovered and analyzed. Ten thickness determinations of plate on the rod indicate an average thickness of about $0.107 \times 10^{-3}$ inches, with a standard deviation of $0.029 \times 10^{-3}$ inches. The plate of oxide is adherent but can be removed by vigorous wiping.

Example 5

In this example, plating is achieved using a nickel solution containing 0.1 g/l of nickel. The volume of nickel solution is 14.18 liters. The pH of the hypochlorite solution is 8.90, but neither it nor the nickel solution contains any boric acid. The effluent flow rate averages 7.9 ml/min. The initial pH of the effluent is 7.73, the final pH is 7.45, and the average of all pH readings is 7.27. The range of effluent pH values is from 6.70 to 8.76. No particles are observed to form in the column and the column is rendered opaque by the end of the run, indicating that plating of metal oxide has occurred. As determined by metallographic analysis, the coating of hydrous nickel oxide on the sample is $0.104 \times 10^{-3}$ inches thick with a standard deviation of $0.034 \times 10^{-3}$ inches.

EXAMPLE 6

This example uses calcium sulfite as oxidant. Plating is achieved using 10.15 liters of nickel solution containing 0.1 g/l of nickel. No boric acid is used. The effluent flow rate averages 14.5 ml/min. The initial pH of the effluent is 8.46, the final pH is 7.75, and the average of all pH readings is 7.96. The range of effluent pH values is 7.75 to 8.46. Particles are observed to form in the column but plating nevertheless occurs. The plate produced on the test piece is $0.068 \times 10^{-3}$ inches thick with a standard deviation of $0.017 \times 10^{-3}$ inches.

When the feasibility of nickel plating had been demonstrated, attention was then turned to plating with hydrous cobaltic oxide. Satisfactory cobalt plating can be achieved using solutions in which nickel and cobalt occurred as a mixture. In all of the following examples, the volume of the metal solution used is 15 liters.

EXAMPLE 7

In this example, plating is achieved using a metal ion solution containing 0.05 g/l of nickel, 0.05 g/l of cobalt and 2 g/l of boric acid. The hypochlorite solution contains 2 g/l of boric acid, and its pH is adjusted to 9.00. The effluent flow rate averages 14.28 ml/min. The initial pH of the effluent is 7.04, the final pH is 4.16, and the average of all pH readings is 5.83. The range of effluent pH values is 3.75 to 7.28. Some particles are observed to form in the column, but satisfactory plating is achieved. The test pieces show an average plate thickness of $0.033 \times 10^{-3}$ inches, with a standard deviation of $0.005 \times 10^{-3}$ inches.

EXAMPLE 8

This example is similar to Example 7, but more drops of metal solution are allowed to enter per drop of hypochlorite solution, resulting in a lower pH of plating. The effluent flow rate is 12.29 ml/min. The initial pH of the effluent is 4.00, the final pH is 3.70, and the average of all pH measurements is 3.84. The range of effluent pH values is 3.56 to 4.55. Some particles are observed to form in the glass column during the initial part of the demonstration, but satisfactory plating is achieved. The test pieces indicate an average plate thickness of $0.052 \times 10^{-3}$ inches with a standard deviation of $0.013 \times 10^{-3}$ inches. Surface analysis of the plate by x-ray photoelectron spectroscopy indicates the ratio of cobalt to nickel is about 3:1 on the surface, and the cobalt appears to be in the trivalent oxidation state. Analysis of the plate by dissolution indicates a cobalt content of about 46 percent by weight of the plate, and a nickel content of less than 1 percent.

EXAMPLE 9

This example is similar to Example 7, except that the initial pH of the hypochlorite solution is 9.01, and it contains 3 g/l of boric acid. Also, the metal ion solution contains 1 g/l of boric acid. The effluent flow rate averages 16.57 ml/min. The initial pH of the effluent is 7.28, the final pH is 5.60, and the average of all pH readings is 6.87. The range of effluent pH values was 5.60 to 7.70. Some particles are observed to have formed in the column, but plating is satisfactory. Test specimens indicate a surface ratio of 7:3 cobalt to nickel. The bulk of the plate contains 32 percent cobalt and 28 percent nickel. The thickness of the plate is $0.036 \times 10^{-3}$ inches, with a standard deviation of $0.013 \times 10^{-3}$ inches.

EXAMPLE 10

This example is similar to Example 7 except the pH of the hypochlorite solution is 9.50, and it contains 2 g/l of boric acid. Also, the metal solution contains 1 g/l of boric acid. The effluent flow rate averages 12.24 ml/min. The initial pH of the effluent is 4.33, the final pH is 4.70, and the average of all pH readings is 6.13. The range of effluent pH values is 4.33 to 7.24. Although particles are observed to form in the column at the start of the demonstration, satisfactory plating is achieved. Test pieces show a thickness of $0.048 \times 10^{-3}$ inches with a standard deviation of $0.006 \times 10^{-3}$ inches. The ratio of cobalt to nickel on the surface of the sample is greater than 9:1, while the analysis of the plate dissolution shows about 49 percent cobalt and 22 percent nickel.

Example 11

In this example, the metal solution used is a manganese solution containing 0.1 g/l manganese but no boric acid. The hypochlorite solution contains 2 g/l of boric acid, and has a pH of 9.50. The effluent flow rate averages 8.3 ml/min. The initial pH of the effluent is 7.00, final pH is 4.55, and the average of all pH readings was 4.80. The range of effluent pH values is 4.28 to 7.00. Particles are observed at the start of the demonstration, but satisfactory plating is achieved. Analysis of test pieces shows the thickness to be $0.181 \times 10^{-3}$ inches with a standard deviation to be $0.016 \times 10^{-3}$ inches. Surface analysis shows the plate to be manganese dioxide, while bulk analysis shows the plate to contain about 53% manganese.

Surface analysis of the plate samples shows that they all contain a significant percentage of carbon on the surfaces. The carbon concentration diminishes as the probe penetrates farther into the bulk of the metal oxide coating. The source of this carbon is uncertain, but it is postulated that it may be due to impurities in the commercial grade sodium hypochlorite solution used in the demonstrations described in the examples set forth herein. (Commercial sodium hypochlorite is an alkaline liquid and is apt to accumulate carbon dioxide as sodium carbonate.)

As the above examples illustrate, satisfactory plating of metal oxides has been demonstrated using techniques whereby dilute aqueous solutions of metal ions are allowed to react with oxidizing agents in a pH-controlled aqueous reaction environment. Effective oxidizing agents include pH-adjusted sodium hypochlorite and calcium sulfite in the presence of oxygen. Substrates onto which metal oxides are plated may be electrically and chemically inert with respect to the plating reactions.

From the foregoing description, one skilled in the art can easily ascertain the essential characteristics of the invention defined in this specification and in the appended claims, and without departing from the spirit and scope thereof, can make various changes and modifications of the invention to adapt it to various usages and conditions.

What is claimed is:

1. A method of plating metal oxides on substrates, comprising the steps of:

providing a dilute aqueous solution of metal ions which, when oxidized, form metal oxide which is insoluble in water;

providing at least one oxidizing agent which can react with said metal ions to form said metal oxide;

providing at least one substrate onto which said metal oxide is to be deposited; and mixing said oxidizing agent with said aqueous solution of metal ions under pH and concentration conditions, and at rates sufficiently low, to permit precipitation and adhesion of said oxide to said at least one substrate placed in contact with said aqueous solution thereby causing plating of said oxide on said at least one substrate.

2. The method of claim 1, wherein said metal ions are selected from the group consisting of cobalt, nickel, manganese and mixtures thereof.

3. The method of claim 1, wherein said metal ions are precipitated in combination with at least one other species of metal ion.

4. The method of claim 1, wherein said oxidizing agent is selected from the group consisting of sodium hypochlorite and calcium sulfite.

5. The method of claim 4, wherein said sodium hypochlorite is mixed in solution with boric acid.

6. The method of claim 4, wherein oxygen is present in addition to said calcium sulfite.

7. The method of claim 1, wherein said pH is adjusted using acid or alkalai in order to regulate rate of oxidation.

8. The method of claim 1, wherein said pH is adjusted by altering the ratio of the amount of metal ions to the amount of oxidant.

9. The method of claim 1, wherein the step of providing a dilute aqueous solution of metal ions which, when oxidized, form metal oxide which is insoluble in water, and the step of providing at least one oxidizing agent which can react with said metal ions to form said metal oxide are operated continuously.

10. The method of claim 1, wherein said at least one substrate is substantially a nonconductor of electricity and chemically inert with respect to said plating.

11. The method of claim 1, wherein said at least one substrate is glass.

* * * * *